United States Patent [19]

Ottaviano

[11] Patent Number: 4,709,499
[45] Date of Patent: Dec. 1, 1987

[54] CHEMILUMINESCENT FISHING LURE DEVICE

[76] Inventor: Gary W. Ottaviano, 24440 Uppingham, Bedford Heights, Ohio 44146

[21] Appl. No.: 755,809

[22] Filed: Jul. 17, 1985

[51] Int. Cl.[4] .............................................. A01K 85/01
[52] U.S. Cl. .................................... 43/17.6; 43/42.06; 43/44.99
[58] Field of Search .................... 43/17.6, 17.5, 42.06, 43/44.99

[56] References Cited

U.S. PATENT DOCUMENTS

| 2,550,988 | 5/1951 | Flournoy | 43/17.6 |
|---|---|---|---|
| 2,674,058 | 4/1954 | Lindenberg | 43/42.06 |
| 3,077,046 | 2/1963 | Murray | 43/17.6 |
| 3,539,794 | 11/1970 | Rauhut et al. | |
| 3,576,987 | 5/1971 | Voight | 43/17.6 |
| 3,579,895 | 5/1971 | Orn | 43/17.6 |
| 3,597,362 | 8/1971 | Bollyky et al. | |
| 3,762,092 | 10/1973 | Bercz et al. | 43/17.6 |
| 3,861,072 | 1/1975 | Holcombe | 43/17.6 |
| 3,969,840 | 7/1976 | Charron | 43/42.06 |
| 4,589,221 | 5/1986 | Mattison | 43/17.5 |

FOREIGN PATENT DOCUMENTS 2232268  5/1973  France ................................. 43/17.6

Primary Examiner—Nicholas P. Godici
Assistant Examiner—Karen Skillman
Attorney, Agent, or Firm—Watts, Hoffmann, Fisher & Heinke Co.

[57] ABSTRACT

A fishing lure with a removable and replaceable chemical containing cartridge for providing chemical fish attractants such as chemiluminescent attractants and olfactory attractants.

17 Claims, 6 Drawing Figures

CHEMILUMINESCENT FISHING LURE DEVICE

DESCRIPTION

Technical Field

The present invention relates to the art of fishing and fishing lures and more particularly relates to a new and novel construction for a fishing lure device with chemical fish attractant. The lure device is of a self-contained construction which contains a removable and replaceable chemical containing cartridge which enables the user to quickly and easily install and replace a light transmitting chemiluminescent attractant cartridge or an olfactory attractant cartridge. When equipped with a chemiluminescent attractant cartridge, the fishing lure device of the invention has particular application for night-time fishing and for fishing in waters that may be murky or otherwise unclear. When equipped with an olfactory attractant, the fishing lure device has application for daytime fishing or in clear water. When equipped with a cartridge containing both chemiluminescent and olfactory attractants, the fishing lure device of the present invention can be used under almost any fishing conditions.

BACKGROUND OF THE INVENTION

Heretofore, fishing products have been known which are electrically activated and which, more recently, have been provided wherein the luminosity is solely the result of a chemical reaction. Such light is known as chemiluminescent light. For example, a fishing product has relatively recently appeared on the market which utilizes a cartridge or container which contains chemiluminescent compositions as generally disclosed in U.S. Pat. No. 3,576,987. This cartridge of container (or something similar thereto) is simply attached to the fishing line generally between some type of reflector and the sinker or fishing weight. Accordingly, such prior construction did not provide a self contained fishing lure but simply a chemiluminescent cartridge attached to the fishing line. Moreover, it is not believed that such prior fishing product would be effective for simulating the swimming action of a particular fish as would a conventional fishing lure. Thus, such prior product would provide a visible glow for the purpose of attracting fish, such as for night-time fishing, but it is believed that such a product would incorporate the aforementioned problem having in mind that important factors, other than simply light, such as smell, should be present in a lure to "catch fish".

DISCLOSURE OF THE INVENTION

In the invention there is provided a chemical attractant fishing lure device which is readily usable for producing either a plurality of selected light colors or a plurality of olfactory attractants or both, which is particularly useful for night-time fishing day-time fishing or fishing under any conditions, depending upon the fisherman's need. The lure device comprises a fishing lure body which may be of a configuration to simulate any desired live-bait and having suitable fishing hooks and line attachment components as known in the art. The lure device includes a body having a recessed cavity which is adapted to removably receive therein a chemical attractant cartridge member. The cartridge member includes a tube-like portion adapted to be slidably and frictionally received in holding relation therein to the recessed cavity of the body of the lure device. The tube-like portion may include rib means for matingly co-acting engagement within corresponding groove means communicating with the recess cavity in the lure body for guiding and centering the cartridge member during insertion, removal and use of the fishing lure. The fishing lure body may be made from a polymeric material having a light transmitting portion encapsulating the cartridge member for rendering the chemiluminescent light visible to the exterior of said lure body.

BEST MODE FOR CARRYING OUT THE INVENTION

Figure 1:
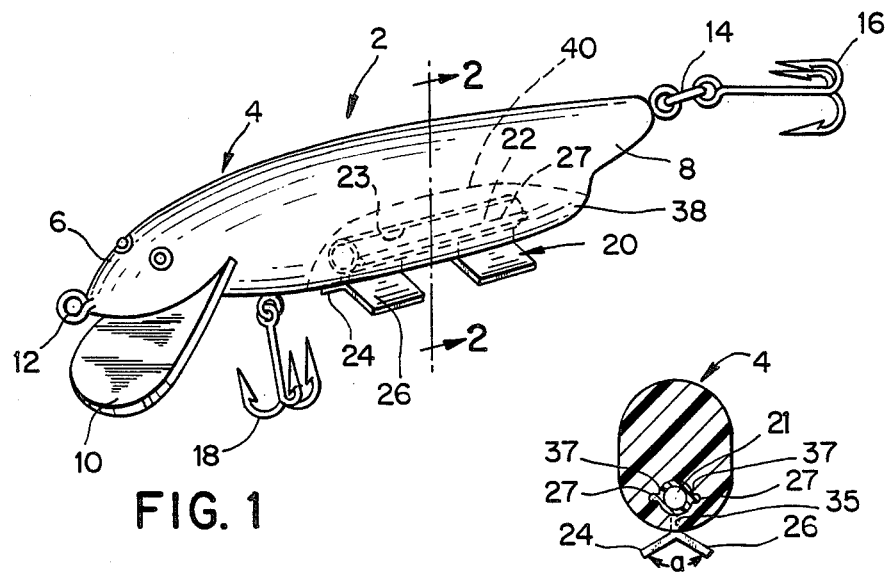
FIG. 1 is a generally perspective view illustrating the new fishing lure device of the present invention.

Referring again to the drawing and in particular to FIG. 1 thereof, there is illustrated the new fishing lure device, designated generally at 2, of the invention. As shown, the lure device tool includes, in one form, an elongated generally cigar-shaped body 4 having a front end portion 6 and a rear end portion 8 which together define the fish-like configuration illustrated. The front end portion 6 is provided with a forwardly and downwardly projecting plate member 10 which acts to control the depth at which the lure is fished, as known in the art. Above the plate member 10 is a front eyelet, as at 12, for detachable connection to the user's fishing line and with a rear eyelet, as at 14, for attachment to the rear treble hook 16, for example. Also, a front treble hook, as at 18, may be detachably mounted adjacent the front portion 6 below the plate member 10.

Figure 5:
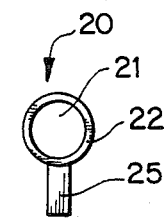
FIGS. 5 and 6 are end views of the carriage member of FIG. 3.
Figure 6:
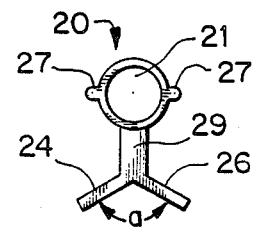

Now in accordance with the invention, there is provided a chemical attractant containing cartridge member, designated generally at 20, which may be removably attached to the body 4 of the lure device 2. The cartridge member 20 includes an elongated, cylindrical member 22 which is adapted to be inserted within a correspondingly shaped recessed portion, as at 23, provided in the body 4. The cylindrical member 22 provides a repository, as at 21, for a chemical attractant composition. A guide portion 25 extends from the cylindrical member 22, as shown in FIG. 5. Alternatively, as shown in FIG. 6 a pair of wing-like guide portions 24, 26 may be provided. The guide portions 24, 26 extend downwardly and convergently outwardly from one another in a direction away from the cylindrical member 22 so as to extend below the corresponding bottom surface of the fish lure body 4. Preferably, the guide portions 24, 26 are disposed at an angle (a) of approximately 120°.

The guide portion 25 or the wing-like guide portions 24, 26 act to guide the fish lure device in a predetermined pattern so as to simulate the actual or live swimming characteristics of the particular type of fish. For example, the lure illustrated may be in the form of a shade fish such that the wing-like guide portions 24, 26 would act to impart this particular swimming action to the lure. In the invention, the cylindrical member 22 and the guide portion 25 or guide portions 24, 26 are preferably constructed from a light-transmitting polymeric (plastic) material. In conjunction with this, when the cylindrical member 22 contains a chemiluminescent chemical attractant in the repository 21 a bright color (e.g. luminescent orange or the like) is departed to the cylindrical member 21 and the guide portion 25 or guide portions 24, 26 to attract the fish particularly for late evening or night fishing.

Now more specifically, the cylindrical member 22 has a transverse exterior diameter so as to be slidably and frictionally retained in the recessed portion, as at 23. In one embodiment, the wing-like guide portions 24, 26 are integrally connected to the cylindrical member 22 by a pair of interconnectng web portions 29, 31 which are longitudinally spaced apart and which extend parallel to one another and in the same vertical plane (FIG. 6) which extends through the longitudinal central axis of the cylindrical member 22. By this arrangement, there are defined two pairs of wing-like portions 24, 26 which, in the form shown, are laterally spaced via an opening 33 formed therebetween.

Figure 2:
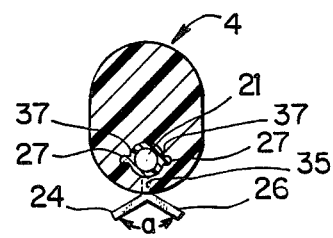
FIG. 2 is a fragmentary, section view taken along the line 2—2 of FIG. 1.
Figure 4:
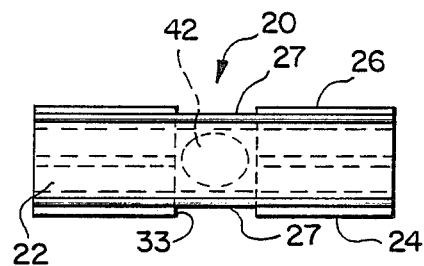
FIG. 4 is, a top plan view of the carriage member of FIG. 3.

In the invention, the cylindrical member 22 is removably received within the correspondingly shaped portion, as at 23, formed in the body 4 of the lure 20 with the lure preferably being made from a polymeric (e.g. plastic) material. The web portions 29, 31 extend downwardly (FIG. 2) through an elongated slot, as at 35, formed in the lure body which communicates the recessed portion 23. The cylindrical member 22 can be inserted into the recessed portion 23 in the lure body 4 via a rear entry opening, as at 38. This rear entry opening communicates with the recessed portion 23 and allows the cylindrical member containing a chemical attractant to be easily inserted and then frictionally retained in fixed relation relative to the lure body 4.

In one embodiment of the invention, the cylindrical member 22 may be made from flexible, light transmitting material to contain one chemically reactive composition, and may include an inner, rigid container 42 for another chemically reactive composition. Flexing the cylindrical member 22 breaks the inner container 42, allowing the reactive compositions to mix and produce a reaction providing chemiluminescent light. Such chemical compositions are also disclosed, for example, in U.S. Pat. Nos. 3,539,794 and 3,597,362 to the American Cyanamid Company, and form no part of this invention per se. Alternatively, the cylindrical member 22 may be impregnated with an olfactory fish attractant for instance, in the manner taught by U.S. Pat. No. 4,579,895.

Figure 3:
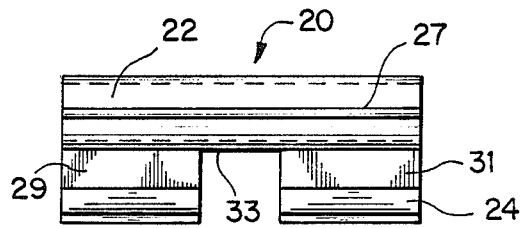
FIG. 3 is a side elevation view, on an enlarged scale, illustrating the carriage member of the present invention.

As further embodied in the invention, the cylindrical member 22 may include a pair of axially extending integral rib portions 27 (FIG. 6) which are adapted to be slidably and frictionally received within the correspondingly shaped recessed grooves 37 (FIG. 2) formed in the body 4 of the lure 2 and communicating with the recessed portion 23 provided therein. The rib portions 27 preferably are diametrically opposed and extend parallel to one another throughout the length (FIG. 3) of the cylindrical member 22. By this arrangement, the rib portions act to guide and center the cylindrical member 22 relative to the recessed portion 23 formed in the lower body.

Now in the invention, the lower portion, as at 40, of the body 4 of the lure 2 may be made from a light transmitting, polymeric material which when a chemiluminescent attractant is used allows light generated via breaking of the container 42 to be visible through the lure body 4 to the exterior for purpose of attracting the fish. Preferably, this light transmitting portion 40 of the lure body is in the lower half of the body and has an area to substantially surround the cylindrical member 22. For example, the lower portion 40 could be of a clear plastic or translucent plastic to provide a window-like construction for light transmitting purposes. The body 4 of the new fishing lure device 2 may, alternately, be of a non-light transmitting material, such a lead. In this case, the light generated by the chemiluminescent attractant is carried by the guide portion 25 or guide portions 24, 26, thus forming a target for fish to strike at on the underside of the lure 2.

Also, in the present invention the chemical attractant cartridge member 20 may be quickly and easily inserted and removed relative to the fish lure body for quick and easy interchangeability with new and/or different devices. For example, for certain fishing conditions, it may be appropriate to utilize different chemiluminescent chemical substances for a particular type of fish and/or for various fishing conditions such as the color of the water as well as the time of day.

At other times, it may be appropriate to utilize various olfactory attractants. Also, the device of the present invention allows for use of both chemiluminescent and olfactory attractants simultaneously, so that the device of the invention is adapted to be used under any fishing conditions. Accordingly, it will be recognized that in accordance with the present invention the chemical attractant lure device can be effectively utilized with practically any lure (e.g. fish, frog, tadpole, squid) configuration.

Other advantages and objects of the present invention will become apparent from the foregoing and as embodied within the scope of the appended claims.

I claim:

1. A fishing lure device of the type for providing a chemical attractant for attracting fish, said device including a lure body having a predetermined shape to generally simulate a fishing bait, said body having an elongated cavity formed therein and having at least one open end communicating with the exterior of said body, and an elongated member removably disposed within said cavity, said elongated member containing a chemical attractant means adapted for providing a selected chemical attractant and having at least one guide member extending outwardly from said elongated member and exteriorly of said lure body.

2. A fishing lure device in accordance with claim 1 wherein said elongated member is cylindrical, and said guide member is bifurcate exteriorily of said lure body.

3. A fishing lure device in accordance with claim 1, wherein said elongated member containing a chemical attractant means includes an outer flexible light-transmitting tube member for containing one reactive chemiluminescent composition, and at least one inner generally rigid tube-like member for containing another reactive chemiluminescent composition whereby flexing of the outer member breaks the inner member allowing the reactive compositions to mix and produce a reaction giving a chemiluminescent light which is visible through the outer light transmitting member.

4. A fishing lure device in accordance with claim 1, wherein said elongated member containing chemical attractant means includes a tube-member impregnated with an olfactory attractant.

5. A fishing lure device in accordance with claim 1, wherein said lure body is made from a polymeric material having a light transmitting portion, and the area defining said cavity is formed from said polymeric, light transmitting portion.

6. A fishing lure device in accordance with claim 1, wherein said lure body is made from an opaque material.

7. A fishing lure device in accordance with claim 3, wherein said reactive compositions, upon mixing, are adapted to produce one of a plurality of selected colors.

8. A fishing lure device in accordance with claim 2 wherein said cavity has an elongated slot which communicates with the interior of said lure body, each said guide member is integrally connected to said elongated cylindrical member by a web portion, and said web portion extends through said slot in the installed position of said cylindrical member;

9. A fishing lure device in accordance with claim 8 wherein each said guide member and web portion define a generally inverted Y-shaped configuration in vertical cross-section and in the installed position thereof;

10. A fishing lure device in accordance with claim 2 wherein there is a single bifurcate guide member.

11. A fishing lure device in accordance with claim 11, wherein said cylindrical member includes exterior rib means extending generally longitudinally thereof and adapted for friction sliding engagement within rib receiving recess means formed in the confronting interior surface of said cavity for automatically aligning said carriage member relative to the cavity formed in said lure body.

12. A fishing lure device in accordance with claim 11, wherein said cylindrical member includes exterior rib means extending generally longitudinally thereof and adapted for friction sliding engagement within rib receiving recess means formed in the confronting interior surface of said cavity for automatically aligning said cylindrical member relative to the cavity formed in said lure body.

13. A fishing lure device in accordance with claim 1, wherein said cylindrical member has a transverse dimension so as to be slidable in and out of the cavity of said lure body and frictionally retained by the inside wall of said cavity.

14. A fishing lure device of the type for providing a chemiluminescent attractant for attracting fish, said device including a one-piece lure body having a predetermined shape to generally simulate a fishing bait, said body having an elongated cavity formed therein and having at least one open end communicating with the exterior of said body and an elongated cylindrical member removably disposed within said cavity and containing a chemiluminescent chemical attractant means adapted for providing a selective light glow, said cylindrical member including an outer flexible light-transmitting tube member for containing one reactive composition, and at least one inner generally rigid tube-like member for containing another reactive composition whereby flexing of the outer member breaks the inner member allowing the reactive compositions to mix and produce a reaction giving a chemiluminescent light which is visible through the outer light transmitting member, said reactive compositions, upon mixing, being adapted to produce one of a plurality of selected colors, said cylindrical member being removably disposed within the cavity in said lure body, said cylindrical member including at least one grippable, fin-like guide member extending outwardly from said cylindrical member and exteriorly of said lure body, and said cylindrical member having a transverse dimension so as to be slidably and frictionally retained within the cavity of said lure body.

15. A fishing lure device in accordance with claim 14 wherein said cylindrical member includes exterior rib means extending generally longitudinally thereof and adapted for frictional sliding engagement within rib receiving recess means formed in the confronting interior surface of said cavity for automatically aligning said cylindrical member relative to the cavity formed in said lure body.

16. A fishing lure device of the type for providing an olfactory attractant for attracting fish, said device including a lure body having a predetermined shape to generally simulate a fishing bait, said body having an elongated cavity formed therein and having at least one open end communicating with the exterior of said body and an elongated cylindrical member removably disposed within said cavity and containing an olfactory chemical attractant means adapted for providing a selective olfactory attractant, said cylindrical member being removably disposed within the cavity in said lure body, said cylindrical member including at least one guide member extending outwardly from said cylindrical member and exteriorly of said lure body, and said cylindrical member having a transverse dimension so as to be slidably and frictionally retained within the cavity of said lure body.

17. A fishing lure device in accordance with claim 16 wherein said cylindrical member includes exterior rib means extending generally longitudinally thereof and adapted for frictional sliding engagement within rib receiving recess means formed in the confronting interior surface of said cavity for automatically aligning said cylindrical member relative to the cavity formed in said lure body.

* * * * *